UNITED STATES PATENT OFFICE.

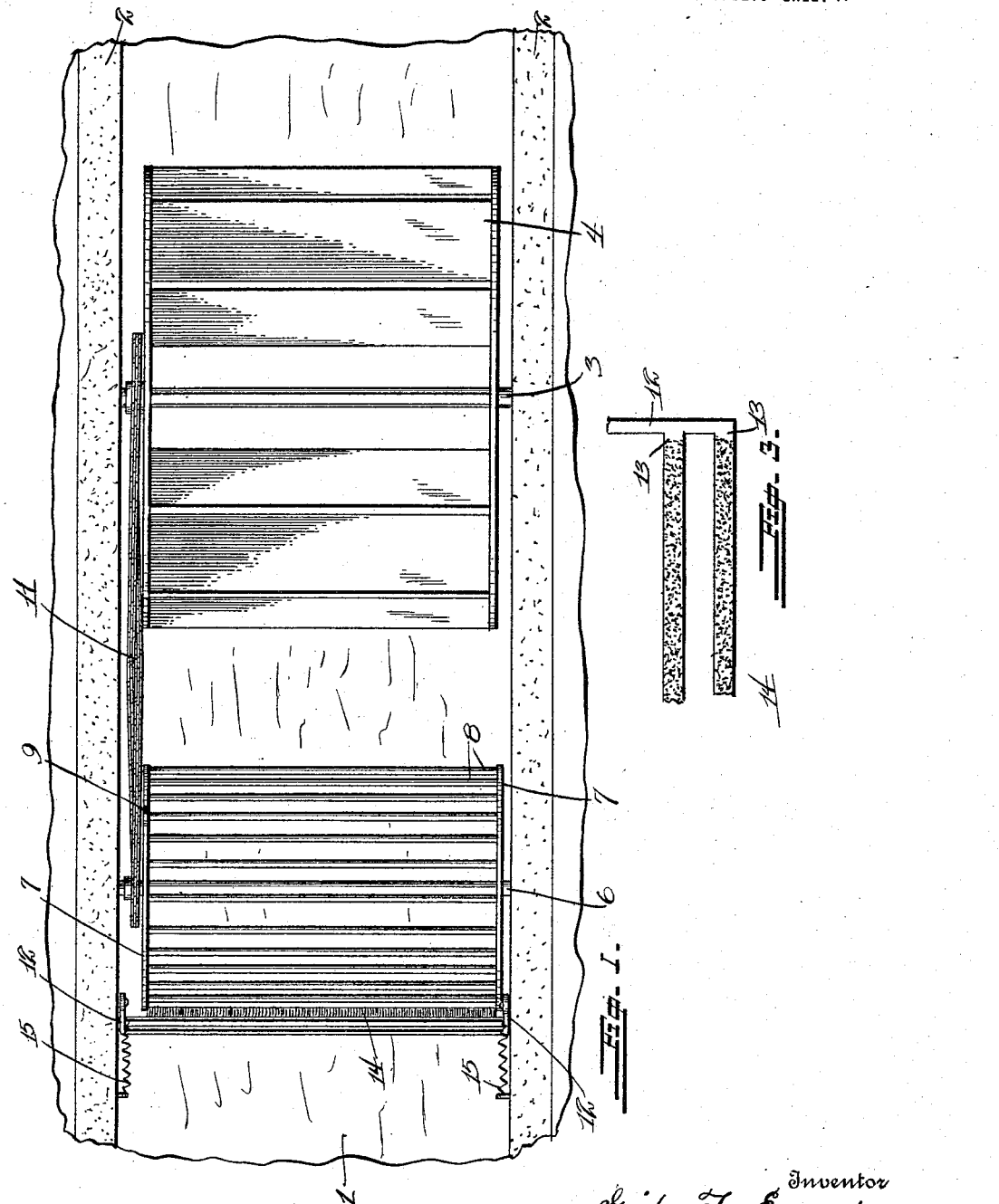

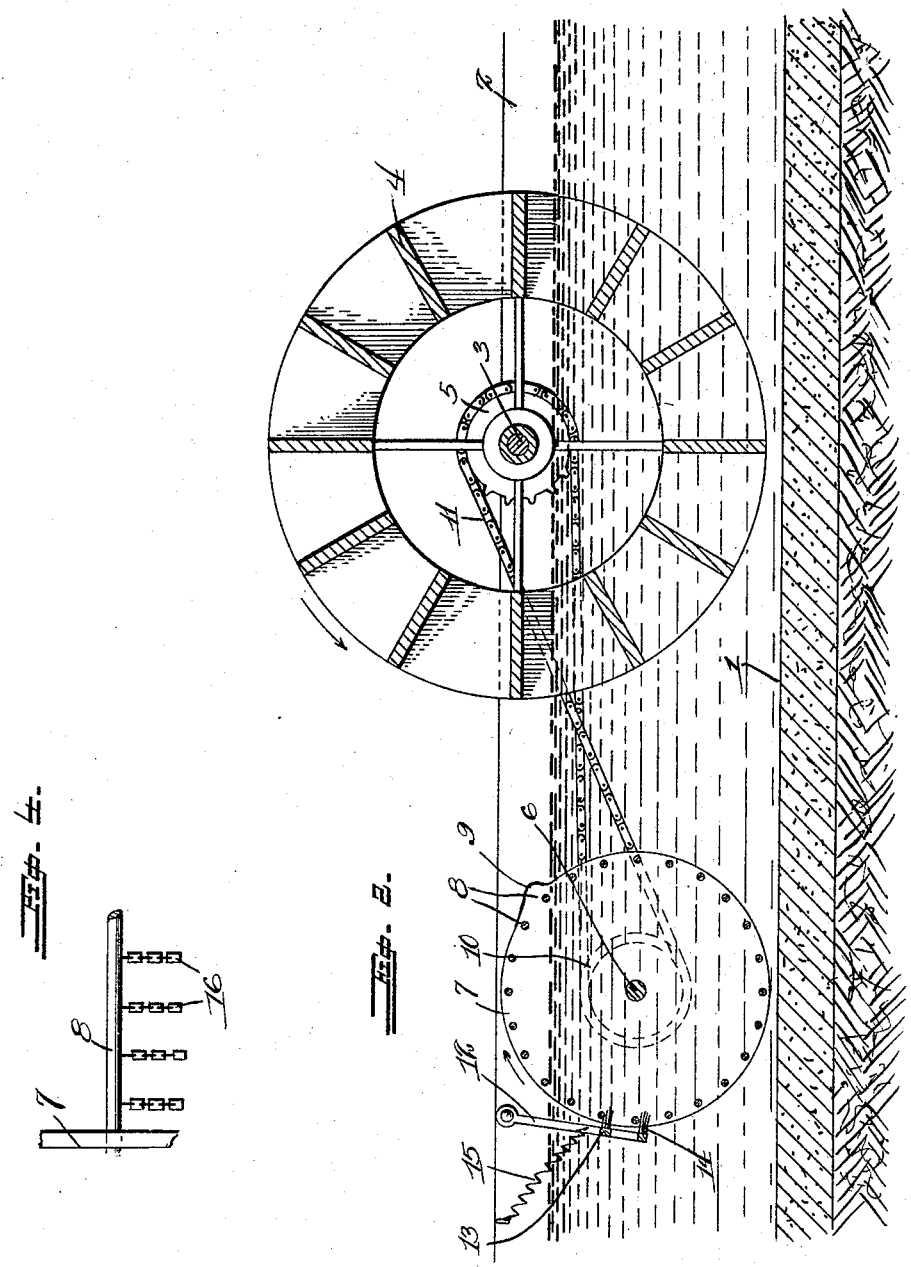

GID T. EVANS, OF REEDLEY, CALIFORNIA.

FISH-STOP.

1,185,188.  Specification of Letters Patent.  Patented May 30, 1916.

Application filed October 2, 1914. Serial No. 864,681.

*To all whom it may concern:*

Be it known that I, GID T. EVANS, a citizen of the United States, residing at Reedley, in the county of Fresno and State of California, have invented certain new and useful Improvements in Fish-Stops, of which the following is a specification.

My invention relates to new and useful improvements in a fish stop.

The primary object of the invention is the provision of such a device which will prevent fish from entering an irrigating stream.

A further object of the invention is the provision of such a device so constructed that it may be used in streams of various widths or depths.

A still further object of the invention is the provision of means for cleaning the stop to prevent clogging.

With these and other objects in view the invention consists in the novel details of construction and arrangement of parts which will be more clearly understood from the following description and drawings, in which, Figure 1 is a top plan view. Fig. 2 is a longitudinal section. Fig. 3 is a fragmental detail of the cleaner, and Fig. 4 is a fragmental detail of a slightly modified form of the invention.

In a device of this character it is essential that provision be made for the easy operation thereof at the same time excluding all fish and preferably preventing the killing thereof. In perfecting the invention I have kept these features in mind and in the drawings, the numeral 1 indicates the bottom of the stream perferably cemented and 2 the sides thereof which are also preferably cemented. Between the sides 2 is provided a shaft 3 upon which is mounted a water wheel 4 of the usual paddle wheel construction. Secured on the water wheel is a gear wheel 5. A second shaft 6 is secured between the sides of the stream and upon this shaft 6 is received the fish stop which comprises the two heads 7 between which are held a plurality of bars 8 which are spaced such a distance as to prevent fish from entering therebetween. One of the heads 7 is provided with a projection 9, the purpose of which will be presently described. Secured upon one of the heads 7 is a gear wheel 10 shown in dotted lines, Fig. 2 of the drawings, and received upon the gear wheels 5 and 10 is a chain 11 which is crossed so that the fish stop will be operated in a direction opposite to that of the paddle.

Pivotally connected to the sides of the stream are the arms 12 having the cross bars 13 to which are secured steel bristles 14 which are adapted to engage the bars 8 of the fish stop their entire length. A coil spring 15 is connected to the sides of the stream and acts upon the arms for normally holding the bristles into contact with the bars. Upon each revolution of the fish stop the projection 9 will engage one of the arms 12 thereby throwing the same back against the compression of the spring and allowing the bristles to be disengaged from the bars and to drop any foreign matter which may be held upon the bristles.

In Fig. 4 of the drawings I have shown a slightly modified form of the invention in which the bars 8 have a plurality of chain sections 16 depending therefrom. These chain sections may be provided, if desired, for further means of excluding the fish from entering between the bars 8. It will be found, however, that if the bars are placed sufficiently close together it will not be necessary to use the chains.

Having described the detailed construction of the invention it is thought that the operation will be clear. The water wheel 4 is operated by the stream and in the direction thereof. The chain 11 being crossed between the water wheel and fish stop will operate said fish stop in a direction opposite to that of the water wheel and the fish coming in contact with the stop will be thrown away from the stop. It will be understood that the water wheel and stop are so positioned with relation to the direction of the flow of the stream that the water will first pass through the stop before engaging the paddles of the water wheel. To prevent clogging of the bars of the stop I have provided the brush for cleaning the same and have also provided the means for releasing the brush for dropping any foreign substance therefrom.

Having fully described the invention what I claim as new and desire to secure by Letters Patent is:—

1. A fish stop comprising a cylinder having a plurality of circumferentially spaced bars, means for rotating the cylinder, a brush normally engaging the bars and means carried by the cylinder for intermittently spacing the brush from the bars.

2. A fish stop comprising a cylinder having a plurality of circumferentially spaced bars, means for rotating the cylinder, a pivotally mounted brush normally engaging the bars, and a projection on the cylinder intermittently engaging the brush for spacing the same from the bars.

3. A fish stop comprising a cylinder having a projection formed on one end thereof and a plurality of circumferentially spaced bars, means for rotating the cylinder, a pivotally mounted brush normally engaging the bars and to be spaced therefrom by engagement with the projection on the cylinder, and a spring for normally holding the brush into contact with the bars.

4. The combination with a stream way, of a water wheel mounted in said way, a cylinder having a plurality of circumferentially spaced bars mounted in said way, a brush pivotally mounted in said way normally engaging the bars of the cylinder, and a projection formed on the cylinder for intermittently spacing the brush from said bars.

5. The combination with a streamway, of a water wheel mounted in said way, a cylinder having a plurality of circumferentially spaced bars mounted in said way, arms pivotally connected to the side of said way, bars having bristles thereon connecting said arms, a spring acting against said arms to force the bristles against the cylinder, and a projection on the cylinder to move the bristles from the cylinder.

6. A fish stop including a cylinder having a plurality of circumferentially spaced bars, flexible members depending from said bars, a projection formed on the peripheral edge of the cylinder head, a brush normally engaging with said bars and intermittently spaced therefrom by the said projection.

7. The combination of a streamway, of a water wheel mounted in said way, a cylinder having a plurality of circumferentially spaced bars mounted in said way, chains depending from said bars, arms pivotally connected to the side of said way, bars having bristles thereon connecting said arms, a spring acting against said arms to force the bristles against the cylinder, and a projection on the cylinder to move the bristles from the cylinder.

In testimony whereof I affix my signature in presence of two witnesses.

GID T. EVANS.

Witnesses:
O. D. LYON,
E. FOWLER.

Copies of this patent may be obtained for five cents each, by addressing the "Commissioner of Patents, Washington, D. C."